Aug. 21, 1956 T. MILLER 2,759,994

TRI-COLOR TELEVISION PICTURE TUBE

Filed June 26, 1952

WITNESSES:

E. A. McCloskey

Leon J. Laza

INVENTOR

Theadore Miller.

BY

F. E. Browder

ATTORNEY

United States Patent Office 2,759,994

Patented Aug. 21, 1956

2,759,994

TRI-COLOR TELEVISION PICTURE TUBE

Theadore Miller, Southgate, Calif., assignor to Westinghouse Electric Corporation, East Pittsburgh, Pa., a corporation of Pennsylvania Application June 26, 1952, Serial No. 295,674

6 Claims. (Cl. 178—5.4)

Figures 1, 2:
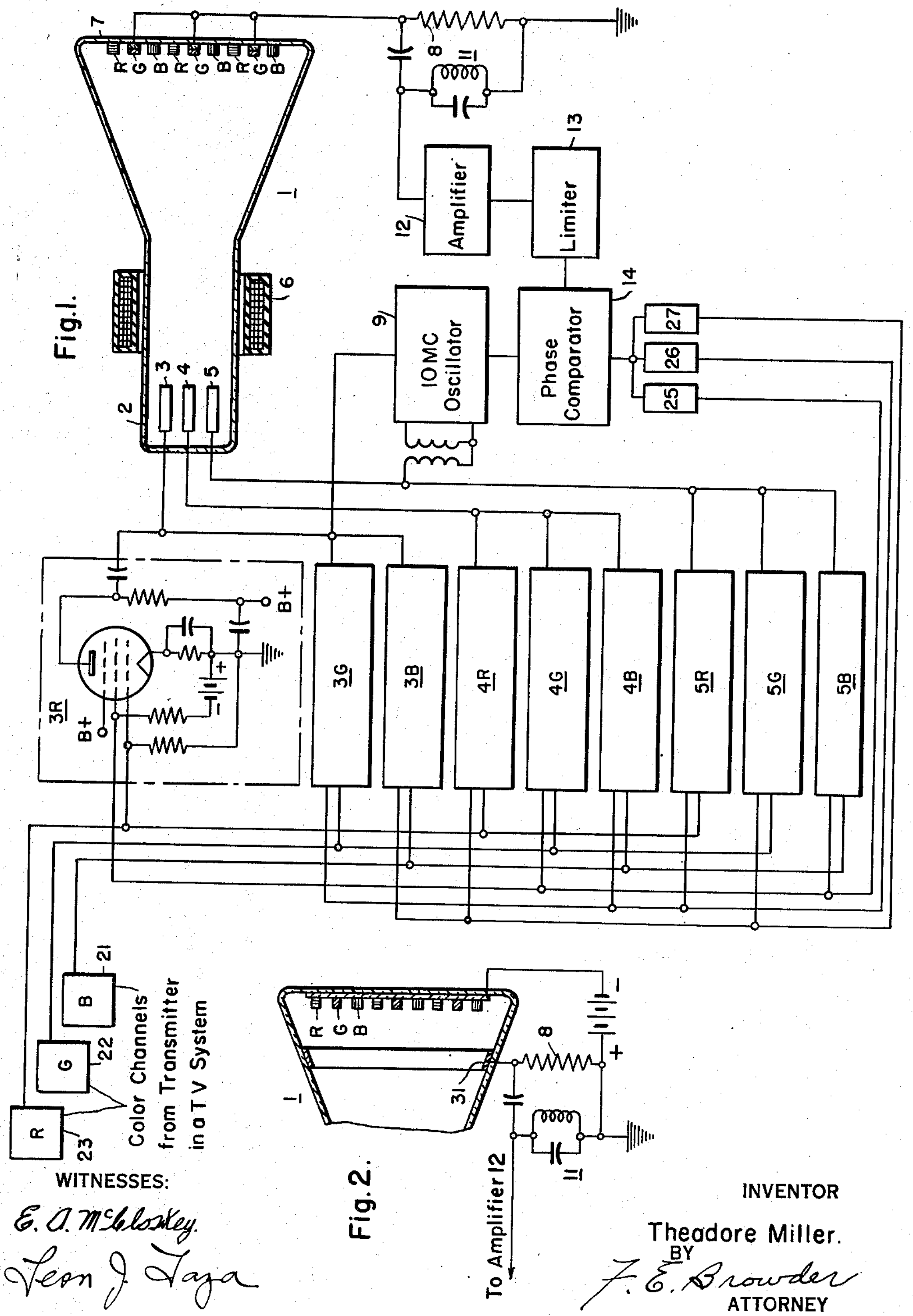

My invention relates to color television systems and in particular relates to a novel type of picture receiver tube for use in such systems.

Transmission of television pictures in color is achieved by separately picking up images of the red, green and blue lights in the view to be transmitted, and sending these to the receiver.

The most widely commercialized color television system of today picks up an entire image or "frame" of the picture in one color at a time (for example the red-light in the picture) and sends it to the receiver which reproduces it in red light at the observer's eyes; then picks up, transmits and reproduces the green-light picture; and then the blue-light picture. Such a transmission is known as frame-sequential. Other systems have proposed sending successively a line of the picture at a time in each color (called line-sequential systems), and still others transmit a small fraction of a line at a time (called dot-sequential systems). Such systems can operate with a receiver having a single scanning-beam which is caused to scan a red-emitting phosphor on its output screen while a red-light image is being transmitted; is shifted to a green-emitting phosphor when a green-light picture is coming in; and so on. But it is characteristic of all these systems that only a single color-image is being transmitted and reproduced at any one instant.

Other color-transmission systems have been proposed, and may be used, in which the red-light, green-light and blue-light images are transmitted and reproduced simultaneously. In accordance with my present invention, I have devised a picture-receiver which may be used with any of the above-described transmission-systems whether of the time-sequential or simultaneous type. It also obviates difficulties arising from the high degree of precision in focussing the electron beam which have proven severe in the case of certain of the above-mentioned systems.

One object of my invention is to provide a color-picture receiver which may be used with either frame-sequential, line-sequential, dot-sequential or simultaneous color-transmission systems.

Another object of my invention is to provide a color-picture receiver capable of depicting on a single screen images in a plurality of different colors, and which automatically insures that each separate color-signal excites on the output-screen only light of its corresponding color.

Still another object of my invention is to provide a color-picture tube utilizing a plurality of scanning beams with means for insuring that any beam is modulated only by signals representing light of the same color as that which that beam is, at any instant, exciting on the output screen.

Yet another object is to provide a picture-reproducing tube having a plurality of differently-colored light-emitters on its output screen and a scanning beam which moves from one to the other of these, modulation of the beam being changed from signals representing the first color to the changed color simultaneously with said movement from one light-emitter to the other.

Other objects of my invention will become apparent upon reading the following description taken in connection with the drawing in which:

Fig. 1 is a schematic diagram of a picture-receiver tube and operating circuits therefor which embody the principles of my invention; and Fig. 2 is a similar view of a portion of Fig. 1 embodying a modified form of my invention.

Referring in detail of the drawing, the picture tube 1 has a vacuum-tight enclosure of a type like that now used in black-and-white kinescopes except that its neck-portion 2 is of larger diameter to accommodate three electron-guns 3, 4 and 5 instead of the single-electron gun of conventional kinescopes. A focussing coil 6 of conventional form brings the three electron beams from guns 3, 4 and 5 to fine foci in three spots on picture screen 7 at the enlarged end of tube 1. The screen 7 comprises a glass plate which supports parallel strips of fluorescent material spaced apart by about one-third of the distance between scanning lines of a conventional black-and-white television receiver screen. The strips are divided into groups of three, a red-emitting strip R, a green emitting-strip G and a blue-emitting strip B, only a few groups being shown here to preserve clarity in the drawing. A thin layer of some transparent conductive material such as NESA marketed by the Pittsburgh Plate Glass Company, Pittsburgh, Pa., is sandwiched between the green strips G and the glass and connects them all to ground through a load-resistor 8. The electron-guns 3, 4 and 5 are focussed so that their beams respectively converge in spots having the same spacing as the strips R, G and B.

As an alternative to backing only the green phosphor strips with conducting coating, all strips may be so backed as indicated in Fig. 2 by a coating connected to a collector electrode 31 through a resistor 8. One set of phosphor strips, e. g. the green-emitting strips, is made to have a higher degree of secondary emission than the other colors. Thus the modulation produced by the electron gun which strikes the green strip dominates the current in the resistor and determines the character of the signal transmitted to amplifier 12.

The scanning coils 6 are so positioned that the scanning lines are slanted relative to the fluorescent strips by an angle which may have any value but is preferably about three degrees.

An oscillator 9 of frequency such as 10 megacycles, which is well above any picture-signal frequency, is arranged to low-percentage modulate the beams from electron guns 3 and 5 in opposite phase, but the middle beam from electron gun 4 is left unmodulated. Thus if the scanning beams from either of electron guns 3 or 5 is incident on a green strip G of screen 7 a current of 10 megacycle frequency will be present, in addition to any picture-signal modulation, in a green strip G and the resistor 8; but if the beam from electron gun 4 alone strikes a green strip G, no 10 megacycle current will pass through resistor 8. A low Q antiresonant shunt 11 separates any 10 megacycle voltage from any picture signal in resistor 8 and impresses it through amplifier 12 and limiter 13 on a phase comparator 14. The latter may be connected so as to have a positive output voltage when the 10 megacycle modulation due to incidence of the beam from electron gun 3 on a green strip G is present in resistor 8; a negative output voltage when the oppositely poled 10 megacycle modulation due to incidence of the beam from electron gun 5 on a green strip G is present in that resistor; and a zero output-voltage when no 10 megacycle modulation is present because only the beam from electron gun 4 is incident on a green strip G.

The above-described phase-comparator output voltages may then be used to switch the connections between the input channels 21, 22, 23 which carry respectively the incoming blue-image, green-image and red-image signals and the electron guns 3, 4 and 5 so that the electron-gun whose beam is incident on the green emitting phosphor strip G at any instant is always modulated in correspondence with the green-image signal from color channel 22; and at the same time so that the scanning-beam incident on the red-emitting strip on screen 7 carries the red-image signal from color channel 23, and the beam incident on the blue-emitting strip carries the blue-image signal from color-channel 21.

The switching operation just mentioned may be carried out by an arrangement of nine gate-tubes, one of which is shown with detailed connections in the drawings and the other eight are represented in block diagrams. Each gate tube has two control-grids and is kept non-conductive by the combined effect of its grids until it is made conductive by a pulse from the phase comparator 14 which makes its second grid sufficiently positive so that it can function as a normal amplifier of incoming picture signals. Briefly stated, a set of three gate tubes is provided for each color input channel and these respectively connect that channel to the three electron-guns 3, 4 and 5. By this means the color modulating a given electron gun at any instant is made to correspond to the color of the fluorescent strip R, G or B which the phase comparator voltage shows that gun to be then exciting.

The gate-tubes are respectively identified by a symbol combining the number of the electron gun and the letter (R, G or B) of the color-channel to which that tube cross-connects the gun. Thus the top tube in the drawing, the circuits of which are shown in detail, has the symbol 3R meaning that, when its second grid is positive, it connects electron gun 3 to the red-image input channel 23 and so modulates the beam from electron gun 3 in correspondence with the red light present in the transmitted picture.

The keying of the nine gate tubes 3R to 5B to carry out the above-described switching is effected by three controllers 25, 26, 27 which are governed by the output voltage of the phase comparator 14, and their respective output circuits each connected to the second grid in each of a group of three tubes among the nine gate tubes above mentioned. The controller 25 is arranged to produce a positive output-voltage when the phase comparator output voltage is zero; and the controllers 26 and 27 produce negative outputs. The positive output of controller 25 renders the gate tubes 4G, 3R and 5B conductive and so electron gun 4 is connected to the green-image input channel 22, electron gun 3 carrying the incoming red image and electron-gun 5 the incoming blue image. Guns 3, 4 and 5 are, it will be remembered, bombarding the red, green and blue fluorescent strips when the phase comparator output voltage is zero; hence these strips are each being excited in correspondence with the incoming signal of the color they emit.

Since the path of the scanning beams across screen 7 is at a slant to the direction of the R, G and B phosphor strips, the green strip G will be bombarded by first one and then another of the three electron beams; and the phase comparator output voltage will change from zero to positive and then to negative values. It is, as previously described, positive whenever the electron gun 3 is bombarding a green strip G; and when it thus becomes positive the output of controller 26 is rendered positive and that of controller 25 made negative together with controller 27. As a result, the gate-tubes 4G, 3R and 5B are made non-conductive to cut guns 3, 4 and 5 off from the red, green and blue color-input channels, and gate tubes 3G, 4B and 5R become conductive to connect guns 3, 4 and 5, respectively, to the green-image, blue-image and red-image input channels 22, 23, 21, respectively. Thus electron gun 3 which now bombards a green strip G is modulated by the green color signal coming in over color channel 22; and electron-guns 4 and 5 are likewise modulated by the channel of the same color as the fluorescing strips they excite.

Similarly when the green-strip G on screen 7 comes under bombardment of electron-gun 5, and the phase comparator output voltage becomes negative as a result, the output of controller 26 is rendered negative and that of controller 27 positive so that gate tubes 3G, 4B and 5R become non-conductive, but gate tubes 3B, 4R and 5G are made conductive. This cuts electron-guns 3, 4 and 5 off from the green, blue and red image input channels and connects them respectively to the blue-image, red-image and green-image channels 23, 21 and 22. As a result the electron gun 5 which is bombarding the green-emitting phosphor strip G is modulated by the input carrying the green image; and similar statements apply to the other electron-guns 3 and 4.

It is thus evident that the phase comparator and gate-tube circuits always react to keep the respective electron-gun connected to color-image signals corresponding to the color-emissions they are exciting at any instant on the output screen 7, regardless of which phosphor strip R, G or B the electron beam is incident on at the time. Whether the electron-beams change incidence to different strips in accordance with the intended program due to the above-described divergence of the direction of the scanning-line from that of the strip R, G, B, or because of some non-linearity or the like in some component which is operating, the switching system still maintains proper correspondence between color-signal and color-emission at all times.

While a transmission system in which all colors are being transmitted simultaneously on three different channels has been described, it will be noted that a system in which the color signals are transmitted in sequence is, in effect, the same thing as a three-color simultaneous system in which, at any particular instant, two color-images are of zero intensity and the third color-image of substantial intensity. For example, when a green (G) color-image is coming in from the transmitter on a color-sequential system the signals on the blue (B) channel 23 and red (R) channel 21 are zero; then when the incoming color-image changes to blue the signal on green (G) channel 22 sinks to zero and a substantial signal is present on blue (B) channel 23; and so on in sequential rotation.

Such sequential color-transmission can be reproduced on the picture-tube 1 since the gate-tube switching system for the three electron guns is competent to reproduce, at any instant, whatever color-image may be coming in over color-channels 21, 22, 23, whether it is single-color or composite-color. The picture-receiving system I have disclosed is accordingly usable on both simultaneous and sequential color-television; and can adequately reproduce sequential system pictures whether the sequence unit is the frame, the line, the dot, or some other sub-division.

While I have described the system as one in which the scanning-path across the screen deviates little from the direction of the phosphor strips, the system is entirely operative regardless of whether the angle between the path and the strip is zero degrees or some other angle.

To eliminate color distortion, it is desirable that the diameter of the scanning beams at the screen be equal to or less than the clear spacing between the edges of adjacent phosphor strips. At times, therefore, when the beams are not centered exactly on the strips, a fraction only of the strip-width will be illuminated, and some intensity-distortion of the picture may result. This distortion may be minimized by focussing the beams to the smallest practicable diameters and having correspondingly slight clear spacing between edges of the phosphor strips. Such distortion may be compensated by automatically adjusting the gain of video amplifiers in the receiver in synchronism with the switching voltages developed at the phase comparator. Thus as the beam approaches or leaves a particular phosphor line, the gain of the video amplifiers can be momentarily increased by the correct amount in response to a signal controlled by the phase-comparator voltage.

I claim as my invention:

1. In combination with a plurality of signal channels carrying signals for images of three primary colors, a screen having strips of fluorescent material arranged in groups of three strips which respectively emit light of three primary colors under electron-incidence, three electron-guns arranged to project scanning-beams onto said strips, means to impart to the beam from one of said guns an identifying pattern, means responsive to incidence of said identifying pattern on said beam on a strip of one said primary color to derive a representative signal and means responsive to said signal to cause the last-mentioned beam to be modulated by the signal channel carrying signals of the same primary color.

2. A color television receiver comprising signal channels for images of three primary colors, a kinescope having a screen which has strips of fluorescent material arranged in groups of three strips which respectively emit light of said three primary colors under electron incidence, three electron-guns to project scanning-beams onto said strips, one of said beams having a form which differentiates it from the other beams, means responsive to incidence of said one of said beams on a strip emitting light of a particular color to generate a signal and means responsive to said signal to connect said one of said beams to a signal channel carrying signals of said particular color.

3. A color picture receiver comprising signal-channels for images of different colors, a picture-screen which has fluorescent areas emitting light respectively of said different colors under impact of a scanning beam, means to project scanning beams equal in number to said different colors into impact with said areas, respectively, means to impart to one said scanning beam a form which differentiates it from the other said scanning-beams, and means responsive to incidence of said one said scanning-beam on a strip emitting light of one said color to generate a signal and means responsive to said signal to cause said one said scanning beam to be modulated by signals for the image of said one said color.

4. A color picture receiver comprising signal channels for images of different colors, a picture-screen having fluorescent areas emitting light respectively of said different colors under impact of a scanning-beam, means to project scanning-beams equal in number to said different colors into impact with said areas, means to impart to one said scanning-beam an identifying pattern, means having an output voltage which varies in dependence upon the fluorescent area on which said one said scanning beam is incident, switching means for connecting said signal channels to modulate said scanning beam, there being a group of said switching means for each said signal channel and each group having a switch for each scanning-means, and means responsive to said output voltage for simultaneously closing the switch in each group which can interconnect the respective color-channels to modulate the scanning-beams which are incident upon fluorescent areas emitting light of their respective colors.

5. A color picture receiver comprising signal channels for images of three different colors, a picture screen which has strips of fluorescent material divided into groups each containing three strips respectively emitting lights of said three different colors under electron impact, means for projecting three scanning-beams into impact with said strips, means to produce an output-voltage which has a higher value when one of said scanning-beams is incident on one strip in a group, is of an intermediate value when another of said scanning-beam is incident on said one strip, and is of a lower value when the third scanning-beam is incident on said one strip, a set of nine switching means for connecting said channels to modulate said scanning beams, there being a group of three switching means for each said channel, and means which cause one tube in each said group to connect its associated channels respectively to modulate a scanning-beam when said output-voltage has said higher value, and cause a second tube in each said group to connect the associated channels respectively to modulate another scanning-beam when said output-voltage has said intermediate value, and cause a third tube in each group to connect the associated channels to modulate a still different scanning-beam when said output-voltage has said lower value.

6. A color picture receiver comprising signal-channels for images of three different colors, a picture screen having strips of fluorescent material divided into groups of three which respectively emit light of said three different colors, under electron impact, means for projecting into impact respectively with three strips of said different colors, three scanning beams two of which respectively carry modulations of different phase, a phase comparator which has an output voltage of higher and lower value when said two scanning-beams are respectively incident on a strip of one said color and has an output voltage of intermediate value when the third scanning-beam is incident on the last-mentioned strip, a set of nine gate-tubes, a group of three for each said signal channel to cause it to modulate said three scanning-beams, and connections to render one gate-tube in each group conductive when said output voltage is of said higher value, a second gate-tube in each group conductive when said output voltage is of said intermediate value, and the third gate-tube in each group conductive when said output voltage is of said lower value, whereby the scanning-beams are always modulated with signals from the color-channel which corresponds with their emitted light.

References Cited in the file of this patent

UNITED STATES PATENTS

| | | |
|---|---|---|
| 2,545,325 | Weimer | Mar. 13, 1951 |
| 2,587,074 | Sziklai | Feb. 25, 1952 |
| 2,617,876 | Rose | Nov. 11, 1952 |
| 2,621,244 | Landon | Dec. 9, 1952 |
| 2,644,855 | Bradley | July 7, 1953 |
| 2,648,722 | Bradley | Aug. 11, 1953 |